United States Patent
Cowelchuk et al.

(10) Patent No.: US 7,108,312 B2
(45) Date of Patent: Sep. 19, 2006

(54) VEHICLE DOOR TRIM BOLSTER WITH MULTI-FEEL COVER AND METHOD OF MAKING THE SAME

(75) Inventors: Glenn A Cowelchuk, Chesterfield Township, MI (US); David Dooley, Troy, MI (US); Michael J Hier, Milford, MI (US); Todd L DePue, Brighton, MI (US); Randy S Reed, Fair Haven, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/904,409

(22) Filed: Nov. 9, 2004

(65) Prior Publication Data

US 2006/0097545 A1 May 11, 2006

(51) Int. Cl.
*B60J 5/00* (2006.01)
(52) U.S. Cl. .................. 296/146.7; 296/153
(58) Field of Classification Search ............ 296/146.7, 296/153, 1.08; 297/411.21
See application file for complete search history.

(56) References Cited

U.S. PATENT DOCUMENTS

| | | | |
|---|---|---|---|
| 3,400,979 A | 9/1968 | James | |
| 4,456,644 A | 6/1984 | Janz et al. | |
| 4,667,979 A | 5/1987 | Wolff | |
| 4,766,025 A * | 8/1988 | Sanok et al. | 428/159 |
| 4,780,345 A | 10/1988 | Gray | |
| 4,781,956 A | 11/1988 | Zimmermann et al. | |
| 4,783,114 A * | 11/1988 | Welch | 296/153 |
| 4,810,452 A | 3/1989 | Taillefert et al. | |
| 4,882,842 A | 11/1989 | Basson et al. | |
| 4,989,535 A | 2/1991 | Lacasse et al. | |
| 5,002,307 A | 3/1991 | Heidorn | |
| 5,040,335 A | 8/1991 | Grimes | |
| 5,048,234 A | 9/1991 | Lau et al. | |
| 5,071,605 A | 12/1991 | Kawaguchi et al. | |
| 5,073,318 A * | 12/1991 | Rohrlach et al. | 264/46.5 |
| 5,089,328 A | 2/1992 | Doerer et al. | |

(Continued)

FOREIGN PATENT DOCUMENTS

DE 19934249 7/1999

(Continued)

OTHER PUBLICATIONS

Examiner Philip Osman, *Combined Search and Examination Report Under Sections 17 and 18(3)*, The UK Patent Office.

(Continued)

*Primary Examiner*—Kiran B. Patel
(74) *Attorney, Agent, or Firm*—Wood, Herron & Evans, L.L.P.

(57) ABSTRACT

A door trim panel for a door frame of a motor vehicle. The door trim panel includes a main body portion adapted to be removably secured to the door frame and a bolster removably secured to the main body portion. The bolster covers an access opening in the main body portion. The bolster includes a substrate having a bolster portion integrally formed with an armrest portion. A cover is integrally molded with the substrate and includes a first portion overlying the bolster portion and having a first thickness, and a second portion overlying the armrest portion and having a second thickness greater than the first thickness to provide a softer feel. The bolster may be made in a two shot molding process with the substrate being formed in the first shot of the molding process and the multi-feel cover being formed in the second shot of the molding process.

5 Claims, 3 Drawing Sheets

U.S. PATENT DOCUMENTS

| | | | |
|---|---|---|---|
| 5,096,221 A | 3/1992 | Combs et al. | |
| 5,178,807 A | 1/1993 | Thary | |
| 5,181,759 A | 1/1993 | Doolittle | |
| 5,224,299 A * | 7/1993 | Abe | 296/39.1 |
| 5,387,390 A | 2/1995 | Kornylo | |
| 5,445,430 A | 8/1995 | Nichols | |
| 5,468,433 A | 11/1995 | Perry et al. | |
| 5,474,841 A | 12/1995 | Matsuki et al. | |
| 5,484,561 A | 1/1996 | Weber et al. | |
| 5,503,903 A | 4/1996 | Bainbridge et al. | |
| 5,536,351 A | 7/1996 | Rheinlander et al. | |
| 5,571,597 A | 11/1996 | Gallagher et al. | |
| 5,573,617 A | 11/1996 | Franck et al. | |
| 5,590,901 A | 1/1997 | MacGregor | |
| 5,626,382 A * | 5/1997 | Johnson et al. | 296/146.7 |
| 5,663,210 A | 9/1997 | Sugimoto et al. | |
| 5,679,296 A * | 10/1997 | Kelman et al. | 264/71 |
| 5,692,711 A | 12/1997 | Tucker | |
| 5,695,870 A | 12/1997 | Kelch et al. | |
| 5,709,925 A | 1/1998 | Spengler et al. | |
| 5,715,966 A | 2/1998 | Nagano et al. | |
| 5,738,810 A | 4/1998 | De Filippo | |
| 5,779,262 A | 7/1998 | Totani et al. | |
| 5,792,413 A | 8/1998 | Ang et al. | |
| 5,799,385 A | 9/1998 | Vecchiarino et al. | |
| 5,803,415 A | 9/1998 | Konishi et al. | |
| 5,810,388 A | 9/1998 | Berardi et al. | |
| 5,816,609 A | 10/1998 | Gray et al. | |
| 5,837,172 A | 11/1998 | Pritchard et al. | |
| 5,871,253 A * | 2/1999 | Erber | 296/146.7 |
| 5,884,434 A | 3/1999 | Dedrich et al. | |
| 5,904,370 A | 5/1999 | Steiner et al. | |
| 5,932,331 A * | 8/1999 | Jones et al. | 296/146.7 |
| 5,941,557 A | 8/1999 | Mullins, Jr. et al. | |
| 5,951,094 A | 9/1999 | Konishi et al. | |
| 5,952,630 A | 9/1999 | Filion et al. | |
| 5,967,594 A | 10/1999 | Ramanujam | |
| 5,976,289 A | 11/1999 | Kawakubo et al. | |
| 5,995,380 A | 11/1999 | Maue et al. | |
| 6,003,716 A | 12/1999 | Allison et al. | |
| 6,012,735 A | 1/2000 | Gray et al. | |
| 6,013,210 A | 1/2000 | Gardner, Jr. | |
| 6,017,617 A | 1/2000 | Gardner, Jr. | |
| 6,070,905 A | 6/2000 | Renault | |
| 6,116,674 A | 9/2000 | Allison et al. | |
| 6,123,385 A | 9/2000 | Bailey et al. | |
| 6,136,415 A | 10/2000 | Spengler | |
| 6,149,853 A | 11/2000 | Luckett et al. | |
| 6,168,188 B1 | 1/2001 | Preisler et al. | |
| 6,185,872 B1 | 2/2001 | Seeberger et al. | |
| 6,210,613 B1 | 4/2001 | Stein et al. | |
| 6,213,538 B1 | 4/2001 | Scheidmantel et al. | |
| 6,214,157 B1 | 4/2001 | Spengler | |
| 6,217,098 B1 | 4/2001 | O'Brien et al. | |
| 6,238,507 B1 | 5/2001 | Jones et al. | |
| 6,248,200 B1 | 6/2001 | Dailey et al. | |
| 6,248,205 B1 | 6/2001 | Scheidmantel et al. | |
| 6,251,326 B1 | 6/2001 | Siano et al. | |
| 6,267,918 B1 | 7/2001 | Bauer | |
| 6,319,438 B1 | 11/2001 | Smith et al. | |
| 6,322,658 B1 | 11/2001 | Byma et al. | |
| 6,325,410 B1 | 12/2001 | Eyrainer | |
| 6,358,599 B1 | 3/2002 | Deibel et al. | |
| 6,364,351 B1 | 4/2002 | Hier et al. | |
| 6,368,093 B1 | 4/2002 | Vecchiarino et al. | |
| 6,381,906 B1 | 5/2002 | Pacella et al. | |
| 6,391,232 B1 * | 5/2002 | Fritsch | 264/46.6 |
| 6,409,947 B1 | 6/2002 | Wandyez | |
| 6,412,287 B1 | 7/2002 | Hughes et al. | |
| 6,413,613 B1 | 7/2002 | Byma | |
| 6,433,728 B1 | 8/2002 | Krupp et al. | |
| 6,447,047 B1 * | 9/2002 | Marcovecchio et al. | 296/146.7 |
| 6,474,724 B1 | 11/2002 | Lemmon et al. | |
| 6,497,443 B1 | 12/2002 | Worrell et al. | |
| 6,526,762 B1 | 3/2003 | Barrow | |
| 6,544,449 B1 | 4/2003 | Gardner | |
| 6,557,929 B1 | 5/2003 | Fox et al. | |
| 6,568,707 B1 | 5/2003 | Hier et al. | |
| 6,588,821 B1 | 7/2003 | Worrell et al. | |
| 6,640,551 B1 | 11/2003 | Slone et al. | |
| 6,652,793 B1 | 11/2003 | Corrion et al. | |
| 6,657,158 B1 | 12/2003 | Skelly et al. | |
| 6,688,640 B1 | 2/2004 | Davis, Jr. et al. | |
| 6,698,819 B1 | 3/2004 | Mozer et al. | |
| 6,715,814 B1 | 4/2004 | Hoyle | |
| 6,740,390 B1 | 5/2004 | Randazzo | |
| 6,756,004 B1 | 6/2004 | Davis, Jr. et al. | |
| 6,758,510 B1 | 7/2004 | Starling | |
| 6,761,388 B1 | 7/2004 | Lein et al. | |
| 6,764,633 B1 | 7/2004 | Takahashi et al. | |
| 6,821,465 B1 * | 11/2004 | Stein et al. | 264/83 |
| 6,872,673 B1 | 3/2005 | MacAulay | |
| 6,893,077 B1 | 5/2005 | DeJongh | |
| 6,899,363 B1 | 5/2005 | Dry | |
| 7,005,092 B1 * | 2/2006 | Dooley et al. | 264/46.5 |
| 2001/0030436 A1 | 10/2001 | Kifer et al. | |
| 2001/0047899 A1 | 12/2001 | Ikeda | |
| 2002/0043861 A1 | 4/2002 | Meadows | |
| 2002/0066972 A1 | 6/2002 | Fritsch | |
| 2002/0078695 A1 | 6/2002 | Hughes et al. | |
| 2002/0125734 A1 | 9/2002 | Pokorzynski et al. | |
| 2002/0140246 A1 | 10/2002 | Worrell et al. | |
| 2002/0153741 A1 | 10/2002 | Speelman et al. | |
| 2002/0195844 A1 | 12/2002 | Hipwell | |
| 2003/0011214 A1 | 1/2003 | Gupte et al. | |
| 2003/0041955 A1 * | 3/2003 | Spengler | 156/221 |
| 2003/0057739 A1 | 3/2003 | Lutz et al. | |
| 2003/0126866 A1 | 7/2003 | Spry | |
| 2003/0155787 A1 | 8/2003 | Lein et al. | |
| 2003/0184064 A1 | 10/2003 | Hier et al. | |
| 2003/0184108 A1 | 10/2003 | Donovan et al. | |
| 2003/0209888 A1 | 11/2003 | Davis, Jr. et al. | |
| 2003/0209890 A1 | 11/2003 | Totani et al. | |
| 2003/0209892 A1 | 11/2003 | Hier et al. | |
| 2004/0017023 A1 | 1/2004 | Schoemann et al. | |
| 2004/0025517 A1 | 2/2004 | Fong | |
| 2004/0035119 A1 | 2/2004 | Slone et al. | |
| 2004/0068992 A1 | 4/2004 | Cauchy | |
| 2004/0119267 A1 | 6/2004 | Cowelchuck et al. | |
| 2004/0119268 A1 | 6/2004 | Davis, Jr. et al. | |
| 2004/0130051 A1 * | 7/2004 | Cowelchok et al. | 264/46.4 |
| 2004/0202824 A1 | 10/2004 | Hayashi et al. | |
| 2005/0023861 A1 | 2/2005 | Hirotani et al. | |
| 2005/0168015 A1 | 8/2005 | Davey et al. | |
| 2005/0183897 A1 * | 8/2005 | DePue | 180/90 |
| 2005/0186388 A1 * | 8/2005 | Mekas et al. | 428/116 |
| 2005/0194806 A1 * | 9/2005 | Cowelchuk et al. | 296/153 |
| 2005/0200161 A1 | 9/2005 | Reed et al. | |
| 2005/0242619 A1 * | 11/2005 | Schoemann et al. | 296/146.7 |
| 2006/0001291 A1 * | 1/2006 | Dooley et al. | 296/153 |
| 2006/0029789 A1 * | 2/2006 | Donatti et al. | 428/304.4 |

FOREIGN PATENT DOCUMENTS

| | | |
|---|---|---|
| DE | 10123207 | 5/2001 |
| DE | 10104036 | 8/2001 |
| EP | 0408202 | 1/1991 |
| EP | 0749872 | 3/2000 |
| EP | 1086863 | 3/2001 |
| EP | 1182024 | 2/2002 |
| EP | 1580077 | 9/2005 |
| FR | 2771356 | 11/1997 |
| FR | 2796610 | 1/2001 |
| JP | 5237871 | 9/1993 |

| | | |
|---|---|---|
| JP | 8011145 | 1/1996 |
| JP | 8026054 | 1/1996 |
| JP | 8183059 | 7/1996 |
| JP | 10291431 | 11/1998 |
| JP | 11070604 | 3/1999 |
| JP | 11123999 | 5/1999 |
| JP | 11291288 | 10/1999 |
| JP | 2000016216 | 1/2000 |
| JP | 2003103676 | 4/2003 |
| JP | 2003266476 | 9/2003 |
| JP | 2005119404 | 5/2005 |
| WO | 01/25055 | 4/2001 |

OTHER PUBLICATIONS

Examiner Monty Siddique, *Combined Search and Examination Report Under Sections 17 and 18(3)*, The UK Patent Office.
Examiner Haydn Gupwell, *Combined Search and Examination Report Under Sections 17 and 18(3)*, The UK Patent Office.
Examiner Peter Gardiner, *Combined Search and Examination Report Under Sections 17 and 18(3)*, The UK Patent Office.
Steven R. Sopher, *Advancements in Soft Polyolefin Bead Foams for Automotive Interior Trim Components*, Borchure, 2004, 10 pgs.
Cowelchuk et al, U.S. Appl. No. 10/904,011, filed Oct. 19, 2004.
Hier et al. U.S. Appl. No. 10/904,032, filed Oct. 20, 2004.
Hier et al, U.S. Appl. No. 10/904,033, filed Oct. 20, 2004.
DePue, U.S. Appl. No. 10/904,433, filed Nov. 10, 2004.
Dry, U.S. Appl. No. 10/905,566, filed Jan. 11, 2005.
Cowelchuk et al., U.S. Appl. No. 10/904,408, filed Nov. 9, 2004.
Cowelchuk et al., U.S. Appl. No. 10/904,407, filed Nov. 9, 2004.
Examiner, Office Action mailed Oct. 4, 2005, U.S. Appl. No. 10/709,658.
Examiner, Final Office Action dated Oct. 3, 2005, U.S. Appl. No. 10/708,500.
Examiner, Final Office Action dated Oct. 13, 2005, U.S. Appl. No. 10/709,382.
DeLong, U.S. Appl. No. 10/710,711, filed Jul. 29, 2004.
DePue et al., Examiner, U.S. Appl. No. 10/904,015, filed Oct. 19, 2004.
Cowelchuk et al, U.S. Appl. No. 10/904,007, filed Oct. 19, 2004.
Cowelchuk et al, U.S. Appl. No. 10/904,008, filed Oct. 19, 2004.
Cowelchuk et al, U.S. Appl. No. 10/904,010, filed Oct. 19, 2004.
Examiner Monty Siddique, *Combined Search and Examination Report Under Sections 17 and 18(3)*, The UK Patent Office.

* cited by examiner

VEHICLE DOOR TRIM BOLSTER WITH MULTI-FEEL COVER AND METHOD OF MAKING THE SAME

CROSS-REFERENCE

The present invention is related to U.S. Ser. No. 10/708,312, filed Feb. 24, 2004; U.S. Ser. No. 10/708,315, filed Feb. 24, 2004; U.S. Ser. No. 10/708,500, filed Mar. 8, 2004; U.S. Ser. No. 10/709,382, filed Apr. 30, 2004; U.S. Ser. No. 10/710,305, filed Jul. 1, 2004; U.S. Ser. No. 10/711,692, filed Sep. 30, 2004; U.S. Ser. No. 10/904,007, filed Oct. 19, 2004; U.S. Ser. No. 10/904,008, filed Oct. 19, 2004; U.S. Ser. No. 10/904,010, filed Oct. 19, 2004; U.S. Ser. No. 10/904,011, filed Oct. 19, 2004; U.S. Ser. No. 10/904,015, filed Oct. 19, 2004; U.S. Ser. No. 10/904,032, filed Oct. 20, 2004; U.S. Ser. No. 10/904,033, filed Oct. 20, 2004; U.S. Ser. No. 10/904,407, filed Nov. 9, 2004; U.S. Ser. No. 10/904,408, filed Nov. 9, 2004 and U.S. Ser. No. 10/904,433 filed Nov. 10, 2004.

DESCRIPTION

1. Field of the Invention

The present invention pertains generally to trim assemblies for vehicle interiors and, more particularly, to door bolsters for vehicle interiors.

2. Background of the Invention

It is known to provide vehicle interiors with various trim assemblies to enhance the aesthetic appearance of the interior and to provide comfort, as well as convenience, to vehicle occupants. For example, vehicle door constructions typically feature a metal door frame with a sheet metal outer panel or skin that defines the door's exterior and an inner sheet metal panel secured to the door frame. Various door components, including window regulator rails, audio speakers, latches, and the like, are fastened in openings defined in the inner sheet metal panel. Covering the inner door panel is a removable trim panel that provides an aesthetically pleasing façade viewed by occupants seated in the passenger cabin of the motor vehicle. Controls are provided on the trim panel for devices such as seats, door locks, mirror and windows. The door latch is connected by a cable to an inner release handle on the trim panel accessible to the vehicle occupant.

Door trim panels have previously been constructed as assemblies in which individual components are assembled together and attached to the panel by several different conventional processes including adhesives, heat staking, sonic welding, fasteners, etc. Such assemblies may include a door trim bolster and an armrest. A door trim bolster typically covers an access opening defined in the trim panel so that when the bolster is removed, a technician or assembly line worker can access the space between the trim panel and the inner door panel to install or service the door components and their drive mechanisms. Bolsters generally include a relatively rigid substrate that provides structural support and defines the general shape of the bolster. The bolster may further include a cover member or outer skin layer of decorative vinyl, cloth, leather, etc. disposed over the front or interior surface of the substrate to provide the aesthetic appearance. Foam padding may be provided between the substrate and skin layer to provide a soft, cushy feel to the bolster. The bolster may then be removeably coupled to the trim panel by conventional means as is known in the art to close off the opening therein.

Armrests are also generally provided on the door trim panel and are positioned so that a vehicle occupant may rest his/her arm or elbow thereon. Armrests are generally constructed in a similar manner as the bolster and include a rigid substrate and a decorative skin layer. To enhance the comfort of the vehicle occupants, the armrests typically include a foam layer between the substrate and skin layer. In this way, when a vehicle occupant rests his/her arm on the armrest, the armrest deforms to provide a soft, cushy feeling. The armrest is likewise coupled to the trim assembly by conventional means. The amount of foam in the bolster is typically less than that provided with the armrest so as to provide a multi-feel trim panel.

One primary drawback with current bolsters and armrests is in the manufacturing and assembly thereof. Specifically, these trim parts typically have been formed by insertion of a resilient soft padding material beneath the skin layer. The preformed, soft, resilient pad also may be secured to a rigid plastic shell and a pliable skin layer stretched over the pad and secured to the shell to form a soft feel armrest or bolster. In other cases, the soft padding has been omitted to provide merely the decorative skin layer over the rigid substrate. In another conventional method of forming trim assemblies with padded areas, a foam material may be injected between the rigid substrate and skin layer to form the foam layer. These methods are generally costly due to the multiple components and manufacturing steps required to make them and, generally, fail to produce a trim part with a multi-feel cover.

In addition, bolsters having integral armrests are known. These bolsters are typically constructed as described above and include a rigid substrate, an outer skin layer and foam padding therebetween. In addition to the shortcomings noted above, another shortcoming of these integrated bolsters is that the foam layer between the skin and substrate is generally of a uniform thickness. While the foam over the armrest portion of the bolster may be relatively thick, it is often undesirable and unnecessary for the thickness of the foam, if any, over the remaining portion of the bolster to be as thick. Furthermore, in another approach, thick skin layers having bumps or nibs formed on the B-side, or back surface, thereof have been applied over rigid substrates in an effort to improve the feel of non-padded integrated bolsters. These nibs raise the skin layer slightly away from the rigid substrate to create "soft" areas that deform when a force is applied thereto. As such, the nib design, not the skin material per se, provides for the soft areas. Also, while these nibbed trim assemblies offer a compromise between padded trim assemblies, they are costly due to the fact that the skin layer must be manufactured separately in order to create the bumps or nibs.

There is thus a need for a door trim bolster with a multi-feel cover for use in a trim assembly, and a method for making the same, that reduces the number of parts, manufacturing steps, and the labor required for assembly thereof, thereby reducing overall manufacturing costs.

SUMMARY OF THE INVENTION

The present invention provides a door trim panel construction including a main body portion having an access aperture adapted to be removably secured to a door frame of a motor vehicle and a bolster removably secured to the main body portion so as to cover the access aperture. The bolster includes a substrate having a bolster portion integrally molded with an armrest portion which is made from a first polymer material. The bolster further includes a cover made from a second polymer material which is integrally molded with the substrate. The cover is configured so as to define a first portion overlying the bolster portion of the substrate and a second portion overlying the armrest portion of the substrate. The first portion has a first thickness and the second portion has a second thickness greater than the first thickness. In this way, the bolster has a multi-feel cover that provides a softer feel to the armrest portion.

In one embodiment, the substrate is made from a first polymer material such as a polyolefin, e.g. polypropylene, polycarbonate/acrylonitrile butadiene styrene, or other suitable materials. The cover is made from a second polymer material such as a thermoplastic elastomer or polypropylene. The second polymer material includes a blowing agent mixed therewith, such as sodium bicarbonate, nitrogen, or any other commonly known blowing agent, to form a cellular structure within the second polymer material. In the first portion of the cover, the formation of the cellular structure within the second polymer material is suppressed so as to form a skin having a substantially non-cellular structure. Within the second portion of the cover, however, the blowing agent produces a lightweight cover that includes a substantially non-cellular outer skin and a cellular inner core. Thus, when a force is applied to the armrest portion of the bolster, the outer skin deforms and compresses the inner core so as to provide a softer feel.

The above-described multi-feel bolster may be formed in a two-shot molding process. In this process, a mold assembly is provided in which a first polymer material is injection molded to form a substrate having a bolster portion integrally formed with an armrest portion in a first shot of the molding process. A mold chamber is then formed about at least a portion of the substrate. A second polymer material is then injection molded in a second shot of the molding process to form the cover. The mold assembly is configured such that the cover includes a first portion overlying the bolster portion of the substrate and having the first thickness, and a second portion overlying the armrest portion having a second thickness greater than the first thickness to provide a softer feel to the armrest portion. Gas counterpressure may be used during the second shot of the molding operation to produce a higher quality exposed surface of the cover. The multi-feel bolster may then be subsequently removed from the mold assembly and mounted to the door trim panel.

The invention provides an improved bolster having an integrated armrest with a multi-feel cover for use in a door trim panel, and a method of making the same, that reduces the number of parts and the labor required for assembly thereof thereby reducing overall manufacturing costs.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE DRAWINGS

Figure 1:
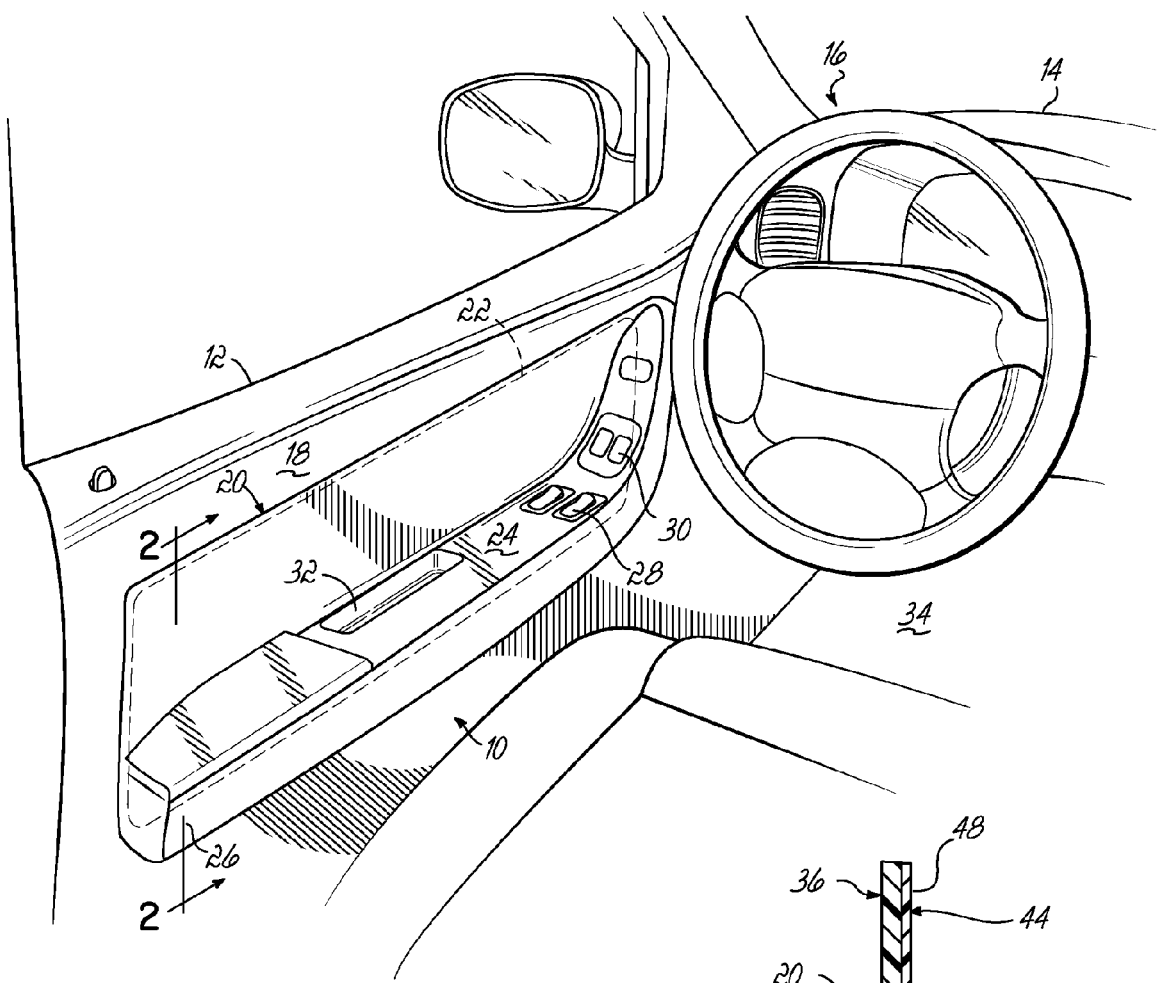
FIG. 1 is a perspective view of a door trim panel fastened to a vehicle door frame and including a bolster of the present invention.

With reference to FIG. 1, a door trim panel 10 constructed in accordance with an embodiment of the invention is fastened to a door of a vehicle such as, for example, an automobile, a truck, or an aircraft. More specifically, door trim panel 10 is coupled as an assembly with, and inboard of, the inner sheet metal of a door frame 12, which has a hinged attachment with a body 14 of an automobile 16. However, persons of ordinary skill in the art will appreciate that door trim panel 10 may be used on other doors including but not limited to sliding doors, hatches, etc. Further, persons of ordinary skill in the art will also appreciate that door frame 12 may be constructed of other materials such as composites like fiberglass and carbon fibers.

The door trim panel 10 includes a main body portion 18 coupled by fasteners with door frame 12, a bolster 20 covering an access opening 22 (shown in dash in FIG. 1) defined in main body portion 18, a switch bezel 24 supported by and secured to the bolster 20 in any suitable manner, such as by an interference fit or suitable fasteners, and an armrest 26 that is integrally formed with bolster 20. Electrical control panels 28, 30 in switch bezel 24 carry control switches that are electrically coupled by a hidden wire harness with conventional electrically-operated components such as door locks, window controls, seat controls, and side mirrors of the automobile 16. The bolster 20 may include a pull cup 32 that permits a passenger occupying passenger cabin 34 of automobile 16 to manually move the assembled door relative to the body 14 for passenger ingress and egress of passenger cabin 34. An inner door release handle (not shown) for operating a door latch (not shown) is also accessible to a passenger inside the passenger cabin 34. An assembly line worker or service technician may access door components, such as an audio speaker, window regulator rails, a window motor, etc., mounted to the door frame 12 via access opening 22 by removing the bolster 20 from the main body portion 18.

Figure 2:
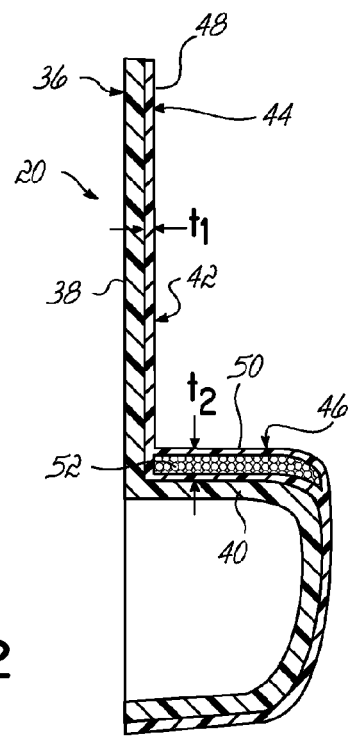
FIG. 2 is a cross-sectional view of FIG. 1 taken generally along the lines 2—2.

As shown in FIGS. 1 and 2, the bolster 20 includes a relatively rigid substrate 36, which forms at least a portion of the structural support, and defines the general shape of the bolster 20. The substrate 36 defines a bolster portion 38 integrally formed with an armrest portion 40 which projects into passenger cabin 34 when mounted to main body portion 18 and provides a resting position for an arm or elbow of a vehicle occupant. Integrally forming the armrest 26 with the bolster 20 advantageously reduces the number of parts and labor required for a fully-assembled trim panel 10 yet permits easy access to the components behind the trim panel 10. The substrate 36 having the bolster portion 38 and integrated armrest portion 40 may be made from a first polymer material such as a polyolefin, like polypropylene, polycarbonate/acrylonitrile butadiene styrene or other suitable materials. The bolster 20 further includes a multi-feel cover 42 that is integrally molded with substrate 36 and covers at least a portion of bolster portion 38 and at least a portion of armrest portion 40. The cover 42 advantageously provides a variable thickness to create the multi-feel cover 42. In particular, cover 42 includes a first portion 44 overlying the bolster portion 38 of substrate 36 and having a first thickness $t_1$. Cover 42 further includes a second portion 46 overlying the armrest portion 40 of substrate 36 and having a second thickness $t_2$. In an advantageous aspect of the invention, the second thickness $t_2$ is greater than the first thickness $t_1$ to provide a multi-feel cover 42 having a softer feel at armrest portion 40 with respect to bolster portion 38.

The cover 42 may be made from a second polymer material such as a thermoplastic elastomer or a polyolefin, such as polypropylene. For example, the thermoplastic elastomer available from Kraiburg TPE Corp. of Duluth, Ga. may be used for the second polymer material. As will be explained in more detail below, the second polymer material may be selectively foamed to form a low-density cellular structure by the addition of a blowing agent to the second polymer material. In particular, in the first portion 44 of the cover 42, the formation of the cellular structure within the second polymer material is suppressed so as to form a relatively high-density skin 48 having a substantially non-cellular structure. Within the second portion 46 of the cover 42, however, the cover 42 includes a substantially non-cellular outer skin 50 and a cellular inner core 52 formed by the blowing agent. In this way, when a vehicle occupant rests his/her arm or elbow on the armrest portion 40 of the bolster 20, the outer skin 50 deforms and compresses the inner core 52 so as to provide a softer feel to the armrest portion 40 relative to bolster portion 38.

The feel of the cover 42 may be varied, or adjusted, to any desired softness by changing the thickness thereof. The second thickness $t_2$ of the cover 42 advantageously is at least 2 times greater, more advantageously about 5–8 times greater, most advantageously about 7 times greater than the first thickness $t_1$ of cover 42. At a thickness of about 1.5 mm and less, the second polymer material of cover 42 defines the skin 48 that is substantially devoid of an inner core because of the inability of the blowing agent to foam the second polymer material. The first thickness $t_1$ of the cover 42 advantageously is about 1–3 mm, more advantageously about 1.5 mm, and the second thickness $t_2$ is about 5–12 mm, more advantageously about 6–8 mm. As will be recognized by one or ordinary skill in the art, the first thickness may be configured so that the first portion 44 of cover 42 may also include a relatively thin inner core beneath skin 48 to provide a soft feel to the bolster portion 38 of bolster 20.

With reference to FIGS. 3A–3D, a method of making the bolster 20 having an integrated armrest 26 with a multi-feel cover 42 will now be described. In an advantageous aspect of the invention, the bolster 20 may be formed in a two-shot molding process. A single mold assembly 60 includes spaced-apart first and second members 62 and 64, and a mold core 66 situated between the members 62, 64. The mold core 66 has opposite first and second cavities 68, 70 each adapted to confront and mate with one of a corresponding first and second cavities 72, 74 defined in the members 62, 64. The mold core 66 is adapted to pivot so that the first and second cavities 68, 70 are confronting, in turn, with the first and second cavities 72, 74 to injection mold, in sequence, first the substrate 36, then the cover 42. While the first and second shots of the injection molding operation are described below with respect to the first cavity 68, it is understood that the first and second shots of the two-shot molding operation may occur in the same fashion with respect to the second cavity 70.

Figure 3A:
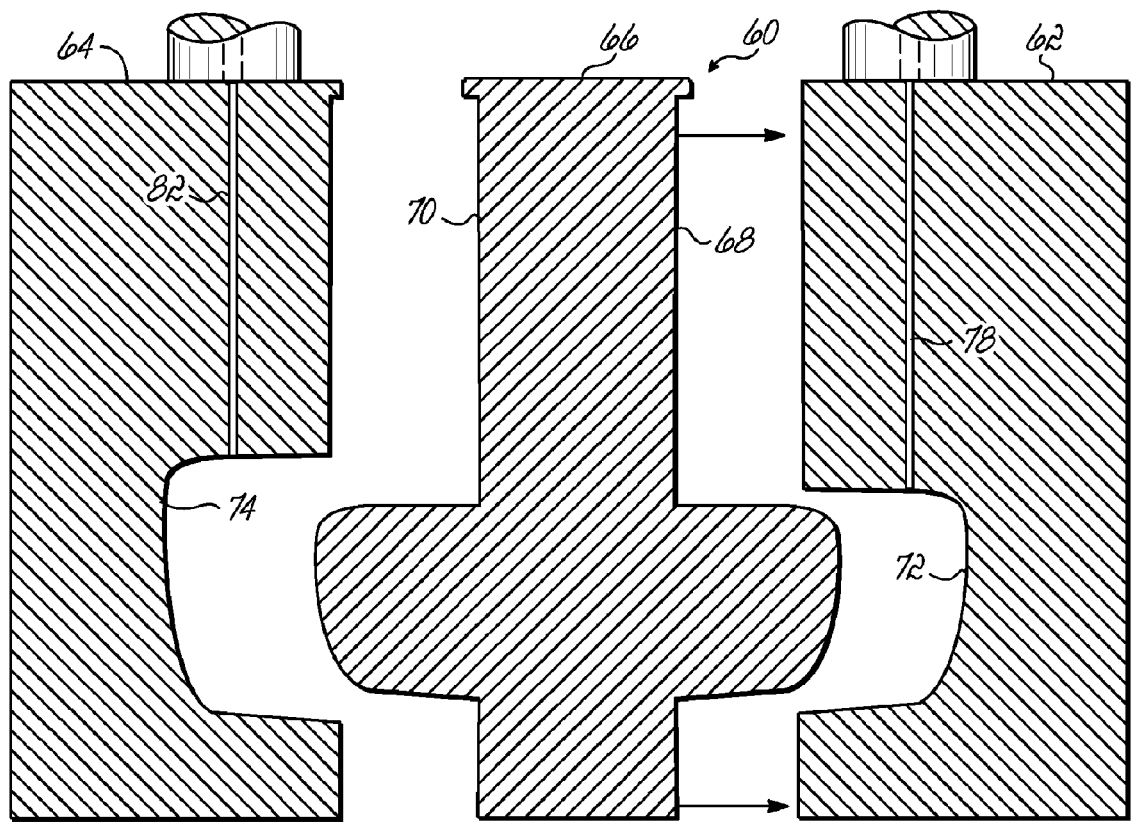
FIGS. 3A–3D are diagrammatic cross-sectional views illustrating a molding process for forming the bolster of the present invention.
Figure 3B:
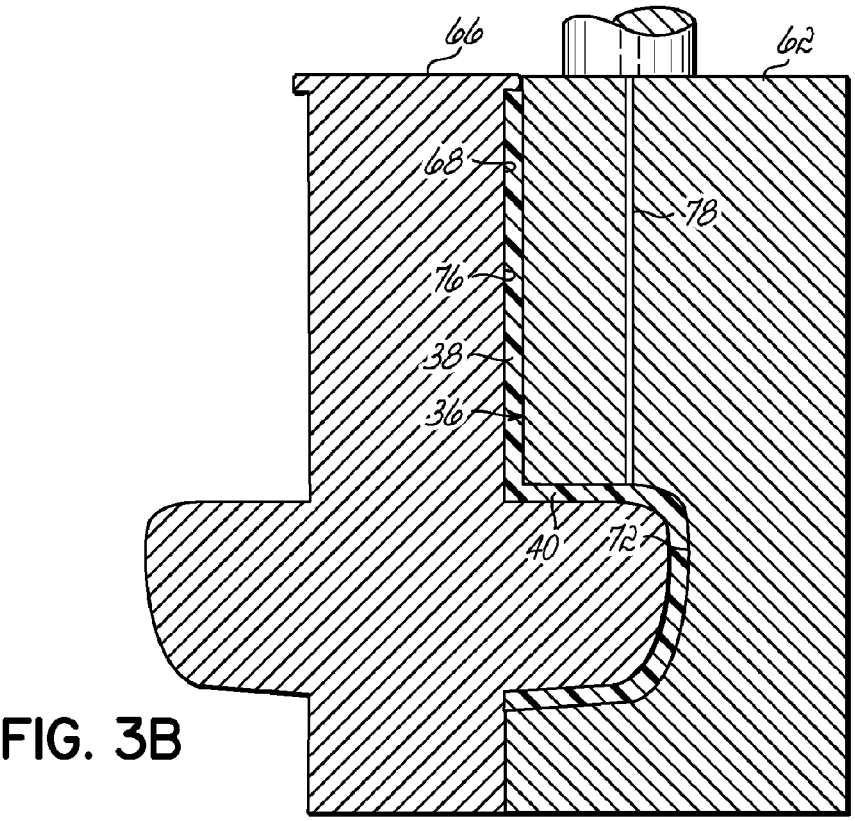

As shown in FIGS. 3A–3B, the first cavity 68 of the mold core 66 is moved into alignment with mold cavity 72 and mated with the first member 62 to define a closed first shot mold chamber 76 defined by cavities 68 and 72. The first shot mold chamber 76 generally defines the shape of substrate 36 and includes the bolster portion 38 and integral armrest portion 40. In a first shot of the molding operation, a first molten polymer suitable for forming substrate 36 is injected through a channel 78 into mold chamber 76. The first polymer material may be a polyolefin such as polypropylene, polycarbonate/acrylonitrile butadiene styrene, or other suitable materials.

Figure 3C:
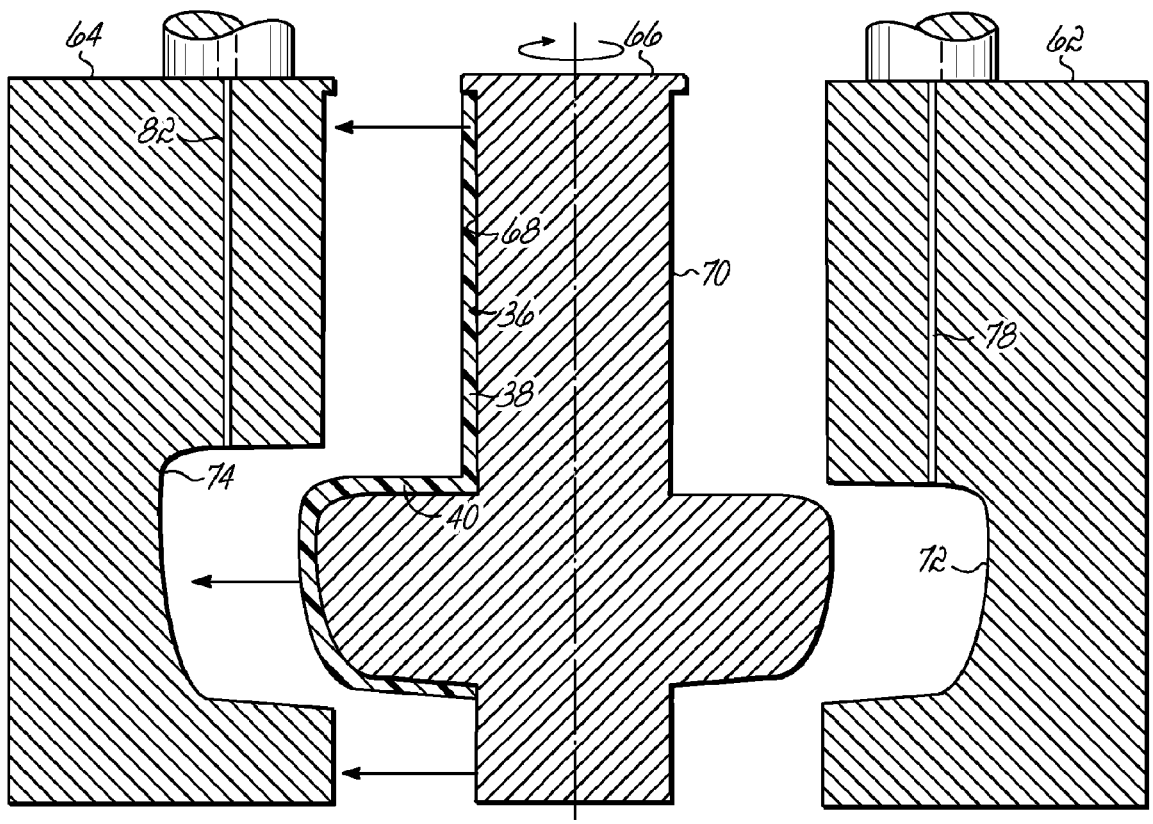
Figure 3D:
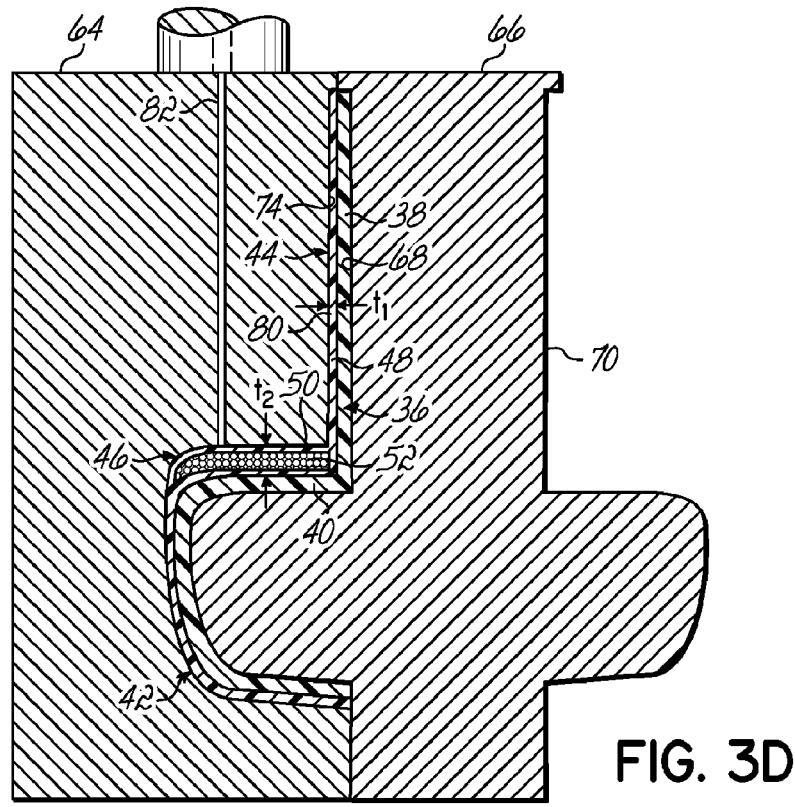

As shown in FIGS. 3B–3D, the first member 62 is moved away from the mold core 66 and core 66 is rotated so that the first cavity 68 carrying substrate 36 confronts and mates with the second cavity 74 to define a closed second shot mold chamber 80 about at least a portion of the substrate 36. The second shot mold chamber 80 generally defines the shape of cover 42 and includes the first portion 44 having a thickness of $t_1$ and the second portion 46 having a thickness of $t_2$. In a second shot of the two-shot molding operation, a second molten polymer material having an additive blowing agent mixed therewith is injected through a channel 82 into second mold chamber 80 to form the cover 42.

In the second shot, the injected molten polymer is activated, or foamed, as is commonly known in the art, by introducing a physical or chemical blowing agent into the molten polymer, generally prior to being injected into mold chamber 80. The blowing agent is advantageously present in an amount from about 0.1% to 5% by weight of mixture, and more advantageously from about 0.1% to 3% by weight. Generally, the blowing agent works by expanding the polymer of inner core 52 to produce a cellular structure having significantly less density than the polymer itself. The blowing agent may be any chemical agent that liberates gas when heated above a characteristic decomposition temperature (e.g. sodium bicarbonate that liberates $CO_2$ when heated above its decomposition temperature), any physical agent such as any gas (e.g. gaseous nitrogen), or any other known blowing agent. As the polymer cools and hardens, gas-filled bubbles originating from the blowing agent define the cellular structure throughout core 52 of a given density. Depending upon the molding conditions, the cell structure of the cured core 52 may either be closed or open. The second polymer material of cover 42 may be a thermoplastic polymer like a thermoplastic elastomer or a polyolefin like polypropylene.

As the mold 60 is cooled, portions of the molten polymer in contact with the second member 64 form the skin layers 48 and 50 on the exposed surface of the finished bolster 20. The skin layers 48, 50 are substantially free of the cells found in core 52 and, therefore have a greater density than the core 52. The thickness of the outer skin layers 48, 50 is dependent upon the cooling rate of the surfaces of the molten polymer that are in contact with the second member 64. Cooling the molten polymer more rapidly may increase the thickness of the layers 48, 50. The distance between the bolster portion 38 of substrate 36 and the second shot mold cavity 74, i.e., $t_1$, may be sufficiently small such that as the molten polymer cools, only skin 48 forms on the bolster portion 38 of substrate 36. For example, at a distance of about 1.5 mm and less between the substrate 36 and second shot mold cavity 74, the polymer material forms only a skin 48 and is devoid of any cellular structure, such as that in inner core 52. The first thickness $t_1$ of cover 42 advantageously is about 1–3 mm and more advantageously about 1.5 mm. As one of ordinary skill in the art will recognize, when the distance between the substrate 36 and second shot mold cavity 74 is greater than about 1.5 mm, a cellular core may form beneath skin 48.

Along the armrest portion 40 of substrate 36, however, the distance between second shot mold cavity 74 and the substrate 36, i.e., $t_2$, is relatively greater than thickness $t_1$ such that as the molten polymer cools, skin 50 and inner core 52 forms on the armrest portion 40 of substrate 36. The second thickness $t_2$ of cover 42 advantageously is at least 2 times greater, more advantageously about 5–8 times greater, and most advantageously about 7 times greater than the first thickness $t_1$ of cover 42. Thus, the second thickness $t_2$ is about 5–12 mm, and more advantageously about 6–8 mm. One of ordinary skill in the art will recognize that the multi-feel of cover 42 may be varied or adjusted to any desired softness by changing the thickness thereof, such as by altering the depth of the second shot mold chamber 80.

In another advantageous aspect of the invention, the second shot mold chamber 80 may be pressurized to prevent any undesirable surface defects in outer layers 48, 50 of cover 42. In many cases when a blowing agent is added to a molten polymer during an injection process the released gas that forms the cellular structure of the core may expand too rapidly so as to penetrate the surface of the melt front as the mold chamber is being filled. The end result is that the outer layers that eventually form in the molding process may include various surface defects that detract from the aesthetic appearance of the trim assembly. To prevent this from occurring, gas counterpressure may be used by pressurizing the second shot mold chamber 80 with a gas, such as air, that does not react with the injected molten polymer that forms cover 42. For instance, the mold chamber 80 may advantageously be pressurized between approximately 100–200 psi during the second shot of the molding process. In this way, the expansion of the gas from the blowing agent is slowed or suppressed which allows the outer layers 48, 50 of cover 42 to form without any surface defects. When the mold chamber 80 is nearly filled with the molten polymer, the counterpressure is released to allow the gas from the blowing agent to expand and form the cellular structure of the core 52.

After the bolster 20 has cooled, the second member 64 is moved away from the core 66, and the bolster 20 is ejected, such as by ejector pins (not shown), from the first cavity 68. The two-shot molding process is repeated to form additional bolsters 20. Although not illustrated, it is understood that the second cavity 70 also is adapted to confront and mate with the first member 62, during the mating of the first cavity 68 with the second member 64, to form a second substrate (not shown) identical to the first substrate 36 by injecting molten polymer into the first shot mold chamber defined by cavities 70, 72 in the first shot of the molding operation. After injection, the mold core 66 is rotated to align the second cavity 70 with cavity 74 in the second member 64 and mated to define a second shot chamber for the second shot of the molding operation while the first cavity 68 returns to a confronting relationship with cavity 72 in the first member 62 to repeat the first shot of the molding operation. In this fashion, multiple bolsters 20 may be serially formed in a continuous and efficient manner.

Although the method of making utilizes a single mold assembly 60 for a continuous, integrated process, it still should be understood that the molding process may be performed in more than one mold assembly such that the bolster 20 may be moved from the first shot mold cavity after the first shot to a second shot mold cavity provided in a second, separate mold assembly (not shown) for the second shot of the molding operation. Bolster 20 or, at the least, cover 42 may also be formed by other multi-component molding processes known to those skilled in the art. For example, cover 42 may be formed by a co-injection molding process in which two or more molten polymers are sequentially or simultaneously injected into the same mold to form skins 48, 50 and inner cellular core 52.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A door trim panel for attachment to a door frame of a motor vehicle, comprising:
    a main body portion adapted to be removably secured to the door frame, said main body portion including an access opening; and
    a bolster removably secured to said main body portion, said bolster covering said access opening, said bolster comprising:
        a substrate having a bolster portion integrally formed with an armrest portion and made from a first polymer material; and
        a cover made from a second polymer material and integrally molded with said substrate, said cover having a first portion overlying said bolster portion of said substrate and having a first thickness, and a second portion overlying said armrest portion of said substrate and having a second thickness, said second thickness greater than said first thickness to provide a softer feel to said armrest portion.

2. The trim panel of claim 1, wherein said first portion of said cover being a substantially non-cellular structure, and said second portion of said cover including a cellular structure.

3. The trim panel of claim 1, wherein said first thickness is about 1–3 mm and said second thickness is about 5–12 mm.

4. The trim panel of claim 1, wherein said substrate includes a material selected from the group consisting of a polyolefin and polycarbonate/acrylonitrile butadiene styrene.

5. The trim panel of claim 1, wherein said cover includes a material selected from the group consisting of a thermoplastic elastomer and a polypropylene.

* * * * *